United States Patent [19]

Doyle

[11] Patent Number: 5,202,951
[45] Date of Patent: Apr. 13, 1993

[54] MASS FLOW RATE CONTROL SYSTEM AND METHOD
[75] Inventor: Edward F. Doyle, Dedham, Mass.
[73] Assignee: Gas Research Institute, Chicago, Ill.
[21] Appl. No.: 710,709
[22] Filed: Jun. 5, 1991
[51] Int. Cl.⁵ .............................................. G05B 5/00
[52] U.S. Cl. ................................. 388/811; 388/907.5; 388/930; 318/432
[58] Field of Search ................................. 388/800–815, 388/930, 907.5; 318/138, 254, 439, 434, 599

[56] References Cited

U.S. PATENT DOCUMENTS

| | | | |
|---|---|---|---|
| 3,572,959 | 3/1971 | Shaughnessay | 415/30 |
| 3,753,067 | 8/1973 | Milligan. | |
| 4,061,950 | 12/1977 | Kayanuma. | |
| 4,218,641 | 8/1980 | Arnold et al.. | |
| 4,330,828 | 5/1982 | Smith et al. | 318/561 X |
| 4,333,041 | 6/1982 | Overland et al.. | |
| 4,360,767 | 11/1982 | Akiyama et al.. | |
| 4,599,548 | 7/1986 | Schultz | 318/599 |
| 4,648,551 | 3/1987 | Thompson et al. | 236/49 |
| 4,667,480 | 5/1987 | Bessler | 318/332 |
| 4,734,628 | 3/1988 | Bench et al. | 318/599 |
| 4,749,927 | 6/1988 | Rodal et al. | 318/599 |
| 4,978,896 | 12/1990 | Shah | 318/25 X |

Primary Examiner—William M. Shoop, Jr.
Assistant Examiner—David Martin
Attorney, Agent, or Firm—Lorusso & Loud

[57] ABSTRACT

A system and method of controlling an electronically commutated motor (ECM) driving a blower to maintain the mass flow rate of the blower at a desired value. A microprocessor-based controller unit derives a motor control signal from just two inputs, namely the desired mass flow rate and a speed feedback signal representing the actual shaft speed of the ECM.

9 Claims, 3 Drawing Sheets

MASS FLOW RATE CONTROL SYSTEM AND METHOD

BACKGROUND OF THE INVENTION

This invention relates to a system and method for controlling the mass flow rate of a blower which is driven by an electronically commutated motor (ECM).

The accurate regulation of mass flow rate of a blower (more precisely the mass flow rate of the gaseous medium transported through the blower) is required in numerous commercial and non-commercial contexts. For example, in a zoned forced air heating system for use in residences, it is advantageous to maintain a desired supply air flow under varying resistances of the heating system, which occur e.g. when heating zones are opened and closed. It is obvious that a regulation of the mass flow would be possible by direct measurement of the actual mass flow rate in a closed-loop control system. However, such measurement requires quite complicated and expensive measuring devices, and it is difficult to obtain in a cost-effective manner precise and fast results that could be used as feedback signals in an electronic control loop.

Accordingly, it is an object of the invention to provide a system and method for accurate, inexpensive mass flow control of a blower without a direct measurement of the actual mass flow rate or the blower pressure rise. The desired mass flow rate should be maintained under varying resistances of the system to which the gaseous medium is supplied by the blower. Furthermore, regulation over a wide range of mass flows should be possible.

SUMMARY OF THE INVENTION

In accomplishing the foregoing and related objects, the invention provides a high efficiency, variable speed, electronically commutated motor (ECM) to drive the blower, and controller means which requires only two inputs, namely the desired mass flow rate and a speed feedback signal representing the actual shaft speed of the ECM. From these two signals, the controller means calculates a motor control signal which controls the torque output of the ECM so that the mass flow rate accurately remains at the desired value regardless of changes in the resistances of the system to which the gaseous medium is supplied. Changing the flow rate signal representing the desired mass flow rate makes possible a fast and precise variation of the mass flow rate over a wide range of flows.

In contrast to known closed-loop control systems which control the ECM shaft speed itself, the invention controls the mass flow rate of a blower driven by the ECM by using the easily and accurately measurable shaft speed as feed-back signal in a closed-loop control system. In accordance with a preferred embodiment, the invention takes advantage of the inherent characteristics of a correctly matched ECM and blower, which allow the functional relationship among a quantity (D) which is a representation of the motor control signal, the actual shaft speed (N) and the desired flow rate (W), to be expressed as follows:

$$D = D_0 + AN + BWN.$$

where $D_0$, $A$, and $B$ are predetermined, positive constants which can be determined experimentally or derived from ECM and blower characteristics. For each specific ECM-blower-combination, he afore-mentioned constants have to be determined only once and may then be memorized in a non-volatile memory. It is apparent that the calculation of the quantity D representing the motor control signal is readily possible from the constants $D_0$, $A$, and $B$, the measured shaft speed $N$, and the desired mass flow rate $W$ by appropriate electronic calculating means. To this end, a microprocessor can advantageously be used.

The term "representation" of the motor control signal is used to indicate that the motor control signal actually supplied to the ECM is not necessarily an analog signal corresponding to the analog or digital value of D, but rather a signal whose torque determining characteristics are functionally dependent on the value of D. In other words, the actual motor control signal varies in a defined manner in accordance with the value of D. In this sense, D is a (direct) representation of the actual motor control signal. Particularly, the actual motor control signal may be a pulse width modulated signal (PWM) whose duty cycle is varied according to the present value of the representation D in a duty cycle generator.

According to another aspect of the invention, there is provided a method of controlling an electronically commutated motor (ECM) driving a blower to maintain the mass flow rate of the blower at a desired value, the method comprising the steps of:

setting said desired value of the mass flow rate and generating an electrical flow rate signal indicative thereof, measuring the shaft speed of the ECM and generating an electrical speed feedback signal indicative thereof, determining from said flow rate signal and said speed feedback signal a motor control signal controlling the torque output of the ECM, thereby adjusting the motor control signal in response to changing values of said flow rate signal and said speed feed back signal to hold the desired mass flow rate corresponding to said flow rate signal.

BRIEF DESCRIPTION OF THE DRAWING

Further aspects and advantages of the invention are apparent from an illustrative embodiment, taken in conjunction with the drawings in which.

DETAILED DESCRIPTION OF A PREFERRED EMBODIMENT

Figure 1:
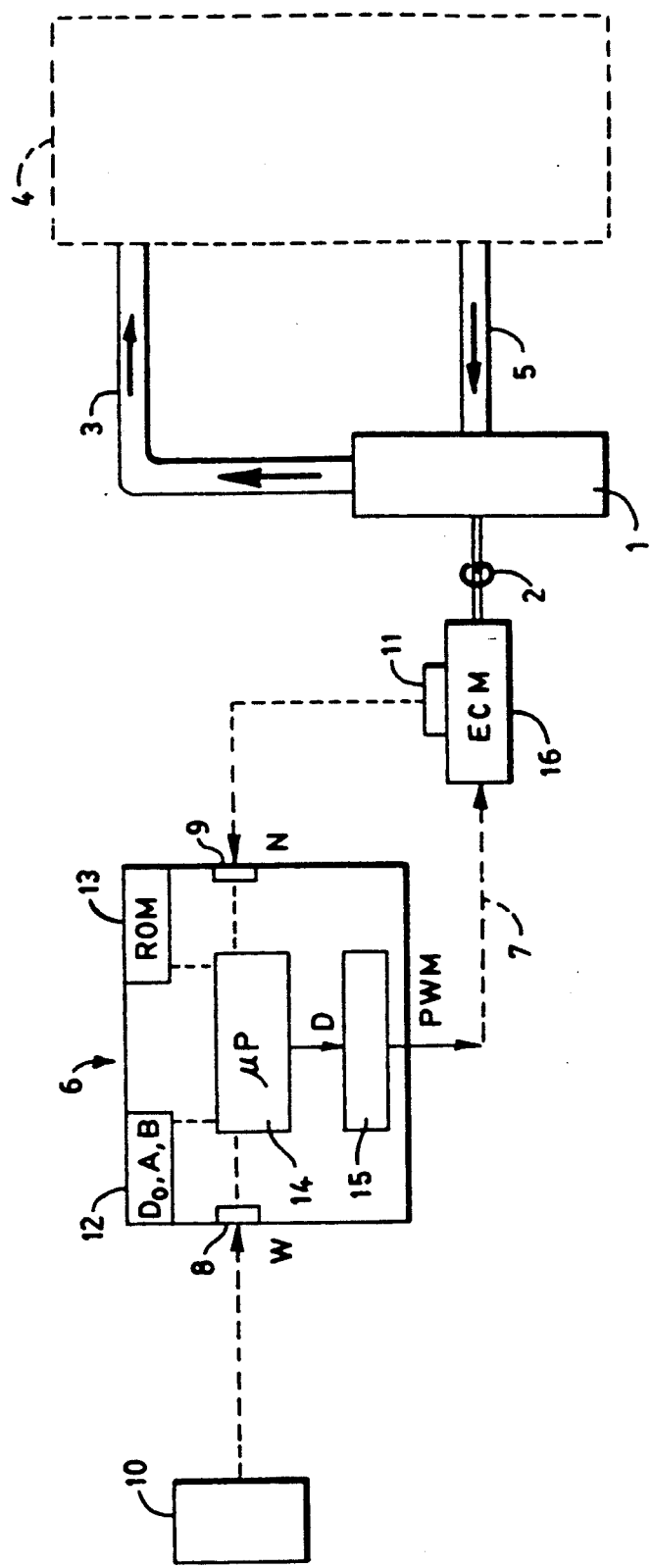
FIG. 1 is a block diagram of an embodiment of a system for controlling the mass flow rate in accordance with the invention.

FIG. 1 shows in block diagram form an electronically commutated motor (ECM) 16 drivably connected to a centrifugal blower 1 via a shaft 2. Through a duct 3, blower 1 supplies air at a predetermined mass flow rate to a variable resistance system which is generally indicated by reference number 4 and not shown in detail. The invention has particular utility for variable resistance systems 4 like forced air heating systems whose system resistance changes when various heating zones are opened and closed, as by dampers. Return air from the system 4 reaches the blower 1 through duct 5.

According to the preferred control system of FIG. 1, controller means 6 is provided for generating a motor control signal PWM which is (via lead 7) sent to the ECM 16 to control its torque output. By the control-loop described below, the torque output of the ECM 16 is continuously adjusted so that mass flow rate of air or any other gaseous medium delivered by the blower 1 is maintained at desired value regardless of changes in the resistance of system 4.

Controller means 6 is provided with two input terminals 8 and 9.

Input terminal 8 is operable to receive a flow rate signal W representing the desired mass flow rate of the blower 1. This flow rate signal W is generated by means 10, which may, e.g., include a microprocessor receiving inputs from selected parameters employed to determine a desired flow rate, or a keyboard or potentiometer arrangement to enter or adjust the desired value of the mass flow rate.

Input terminal 9 is operable to receive a speed feedback signal N representing the actual shaft speed of the ECM or blower 1. This speed feedback signal N is generated by means 11, which may, e.g., include a tachometer mounted to the shaft 2 (or any other suitable rotating part). It is also possible to derive a speed feedback signal from the back EMF on the power lines connected to the ECM poles (not shown).

It is a characteristic feature of the invention that the controller 6 requires only two inputs, namely the desired mass flow rate signal W and the speed feedback signal N to generate the correct motor control signal PWM to hold the desired mass flow rate regardless of changes in the resistance of system 4.

The invention takes advantage of the inherent characteristics of a correctly matched ECM and centrifugal blower to maintain accurate mass flow control without a direct measurement of the actual mass flow rate or the blower pressure rise. When the ECM and blower characteristics are correctly matched, there is a simple relationship between the representation D of the motor control signal, the speed feedback signal N, and the desired flow rate signal W, which can be expressed by the following equation:

$$D = D_0 + AN + BWN \quad (1)$$

where $D_0$, A, and B are predetermined, positive constants which are stored in non-volatile memory 12. The inherent characteristics of the ECM and blower which are required for equation (1) to apply are discussed below referring to FIGS. 2 and 3.

As mentioned above, the term "representation" of the motor control signal is used to indicate that the motor control signal actually supplied to the ECM may differ from a simple analog signal corresponding to the analog or digital value of D, but rather may be any suitable signal whose torque determining characteristics are directly functionally related to the value of D. Particularly, the actual motor control signal may be a pulse width modulated signal (PWM) whose duty cycle is varied according to the present value of the representation D in a duty cycle generator 15. The duty cycle generator may also be implemented by a microprocessor 14. The control system according to the embodiment of the invention illustrated in FIG. 1 is preferably operated according to the following method including the steps:

1. Set the desired, predetermined value of the mass flow rate and generate an electrical mass flow signal (W) indicative thereof. This is done by appropriate means 10 (e.g. a keyboard unit). The mass flow signal is then inputted to the controller 6 via input terminal 8.
2. Electronically measure the shaft speed of the ECM 16 to generate an electrical speed feedback signal (N) and input the signal N to the controller 6 via input terminal 9.
3. Using equation (1), calculate a representation (D) of a motor control signal supplied to the ECM 16 to control the torque output thereof. In the present embodiment, a microprocessor 14 programmed by appropriate program steps stored in a ROM 13 performs this calculation using the constants stored in memory 12.
4. Using the present value of D from step 3, generate a pulse width modulated motor control signal PWM in duty cycle generator 15 and input the signal PWM to the ECM 16.
5. In response to changing values of N and/or W, adjust the value of D (and as a function thereof the actual, pulse width modulated motor control signal PWM). For example, the shaft speed (N) will change in response to a change in the resistance of system 4. This will result in a correction of the motor control signal PWM until successive values of D as determined by equation (1) are the same.

Figure 2:
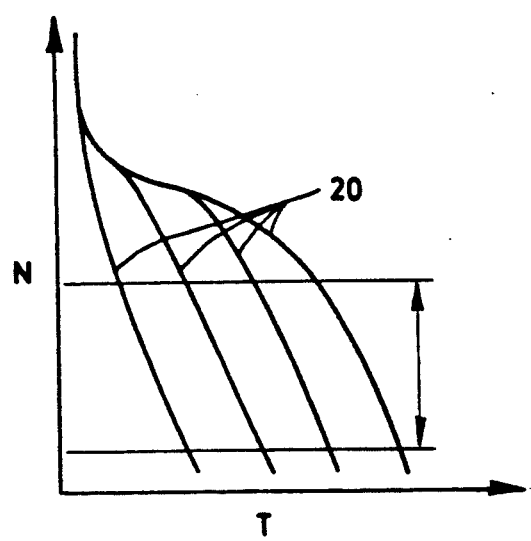
FIG. 2 is a graph illustrating ECM characteristics.
Figure 3:
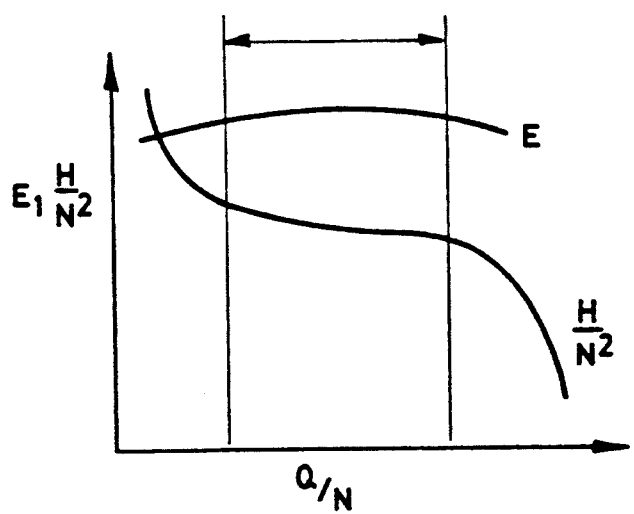
FIG. 3 is a graph illustrating blower characteristics.

The inherent characteristics of the ECM 16 and blower 1 which are required for equation (1) to apply are illustrated in FIGS. 2 and 3. These are:

1. The torque output (T) of the ECM 16 in the normal operating range can be represented by the equation:

$$T = C(D - D_0) - GN \quad (2)$$

where C and G are constants. This is shown in FIG. 2: In the normal shaft speed range of operation, lying between the two dashed lines, torque T approximately is a linear function of N for any fixed value of D. The four different branches 20 shown in FIG. 2 refer to different values of D, respectively (lines of constant D).

2. The torque input (T) to the blower 1 in the normal operating range can be represented by the equation:

$$T = KWN \quad (3)$$

where K is a constant. This occurs when the blower head rise (H) divided by the square of the shaft speed (N) and the blower efficiency (E) are approximately constant over the normal operating range indicated between the two dashed lines in FIG. 3. In FIG. 3 Q is the volume flowrate (i.e., mass flow rate divided by gas density), and H is the blower head rise (i.e., pressure rise imparted to the gas stream by the blower divided by the gas density). Equation (3) can be derived as follows:

$$T = WH/2\Pi NE =$$
$$= (H/2\Pi E N^2) WN =$$
$$= KWN$$

where the constant K is given by $K = H/2\Pi E N^2$.

Equation (1) can be readily derived by equating the expressions for T in equations (2) and (3) and renaming the constants involved.

It should be noted that the ranges over which N and Q/N are constant in FIGS. 2 and 3 will change with the particular motor/blower combination selected. In FIG. 2 the tests were performed where the value of N ranged from 250 to 1250 revolutions per minute. In FIG. 3 the tests were performed where the values of Q/N are in the range of 1.0 to 1.6 cubic feet per minute/revolution per minute.

Figure 4:
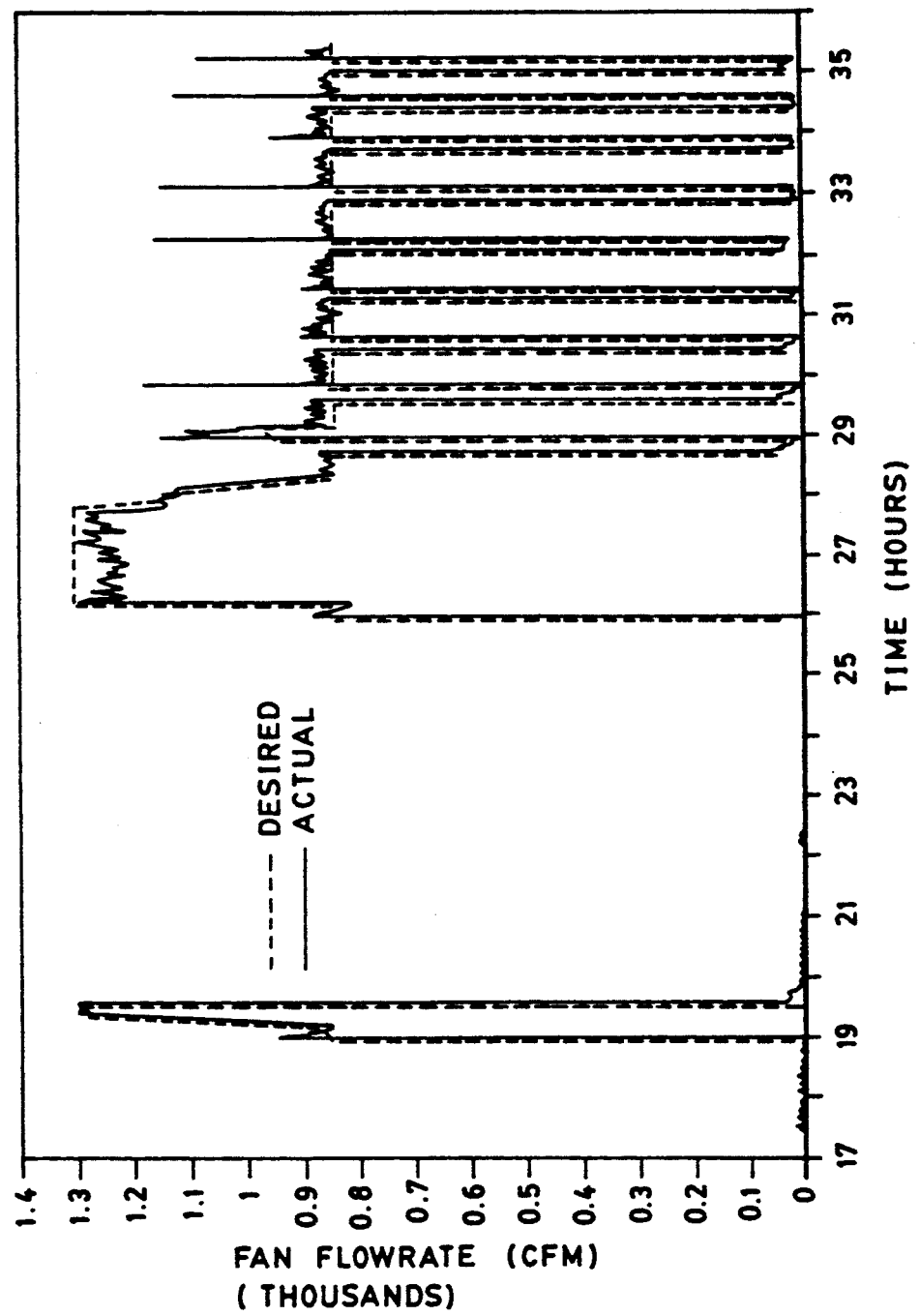
FIG. 4 is a graph illustrating the actual supply air flow and the desired supply air achieved over an 18 hour test period.

FIG. 4 shows a comparison of the actual supply air flow to the desired supply air flow achieved over an 18 hour test period. It illustrates that the flow of supply air was accurately controlled to the desired value as the furnace was turned on and off and the furnace firing rate was modulated over a range from its minimum firing rate to its maximum firing rate. The test results were achieved using prototype variable-air-volume (VAV) residential, warm-air furnaces built to incorporate the invention. The furnaces were constructed by modifying Rheem Model RGEA-10ECAFS fixed air flow furnaces. The production motor that normally drives the supply air blower was replaced with a prototype ⅓hp ECM (model number 5SME39HGLX15-T) supplied by General Electric. A modified Tecogen single-board controller which incorporates a Motorola 68000 microprocessor was used to control the motor in accordance with the methods previously described.

While various aspects of the invention have been set forth by the drawings and the specification, it is to be understood that the foregoing detailed description is for illustration and that various changes in form and detail may be made without departing from the spirit and scope of the invention as set forth in the appended claims.

What is claimed is:

1. A system for controlling the mass flow rate of a blower which is drivably connected to an electronically commutated motor (ECM), the system comprising:
   means for generating a mass flow rate signal representing the desired mass flow rate of the blower,
   means for generating a speed feedback signal representing the actual shaft speed of the ECM,
   controller means for generating a motor control signal for supply to the ECM to control the torque output thereof,
   said controller means including a first input terminal for receiving said mass flow rate signal and a second input terminal for receiving said speed feedback signal, and
   said controller means operable to adjust said motor control signal as a function of said speed feedback signal and said mass flow rate signal to maintain the actual mass flow rate at a desired value which is represented by said mass flow rate signal.

2. The system of claim 1, wherein said controller means is operable to calculate a representation (D) of said motor control signal from said mass flow rate signal (W) and said speed feedback signal (N) according to the equation $$D = D_0 + AN + BWN,$$

where $D_0$, $A$, and $B$ are predetermined, positive constants.

3. The system of claim 2, wherein the controller means includes a microprocessor to perform the calculation of said representation (D) of the motor control signal.

4. The system of claim 2, further comprising nonvolatile memory means for memorizing the constants $D_0$, $A$, and $B$.

5. The system of claim 2, wherein the controller means comprises a duty cycle generator to convert said representation of the motor control signal into a pulse width modulated motor control signal for transmittal to the ECM, the duty cycle of said pulse width modulated motor control signal being determined by said representation of the motor control signal.

6. The system of claim 5, wherein said controller means includes a microprocessor.

7. The system of claim 1, wherein the blower is connected to a forced air heating system to provide supply air to said forced air heating system at said desired mass flow rate regardless of changes in the resistance of the heating system.

8. A method of controlling an electronically commutated motor (ECM) driving a blower, so as to maintain the mass flow rate of the blower at a desired value, the method comprising the steps of:
   setting said desired value of the mass flow rate and generating an electrical mass flow rate signal indicative thereof,
   measuring the shaft speed of the ECM and generating an electrical speed feedback signal indicative thereof,
   determining from said mass flow rate signal and said speed feedback signal a motor control signal for controlling the torque output of the ECM, and
   adjusting the motor control signal in response to changing values of said mass flow rate signal and said speed feedback signal to maintain the desired mass flow rate corresponding to mass flow rate signal.

9. The method of claim 8 comprising the step of calculating a representation (D) of said motor control signal from said mass flow rate signal (W) and said speed feedback signal (N) according to the equation $$D = D_0 + AN + BWN,$$

where $D_0$, $A$, and $B$ are predetermined constants, and thereafter determining the actual motor control signal in response to said representation (D).

* * * * *